United States Patent

[11] 3,530,898

| [72] | Inventor | John R. Wilson |
| | | Cupertino, California |
| [21] | Appl. No. | 771,817 |
| [22] | Filed | Oct. 30, 1968 |
| [45] | Patented | Sept. 29, 1970 |
| [73] | Assignee | Raychem Corporation |
| | | Menlo Park, California |
| | | a corporation of California |

[54] CLOSURE SLEEVE
7 Claims, 6 Drawing Figs.

[52] U.S. Cl. .................................................. 138/99,
138/167
[51] Int. Cl. ......................................................... F16l 55/16
[50] Field of Search ...................................... 138/147—149,
96—99, 110, 156—167

[56] References Cited
UNITED STATES PATENTS
| 1,149,702 | 8/1915 | Vail ............................ | 138/158 |
| 3,379,218 | 4/1968 | Conde ......................... | 138/99 |

*Primary Examiner*—Henry S. Jaudon
*Attorney*—Lyon and Lyon

ABSTRACT: A closure sleeve for pipes or the like constructed from a piece of independently dimensionally heat unstable material, that is, material that will return to its original shape and dimensions upon application of heat alone. The sleeve is split and provided along the edges with a plurality of loops. To install the sleeve, the edges are connected by passing a suitable rod through the loops, and the resulting tubular member can then be heat recovered.

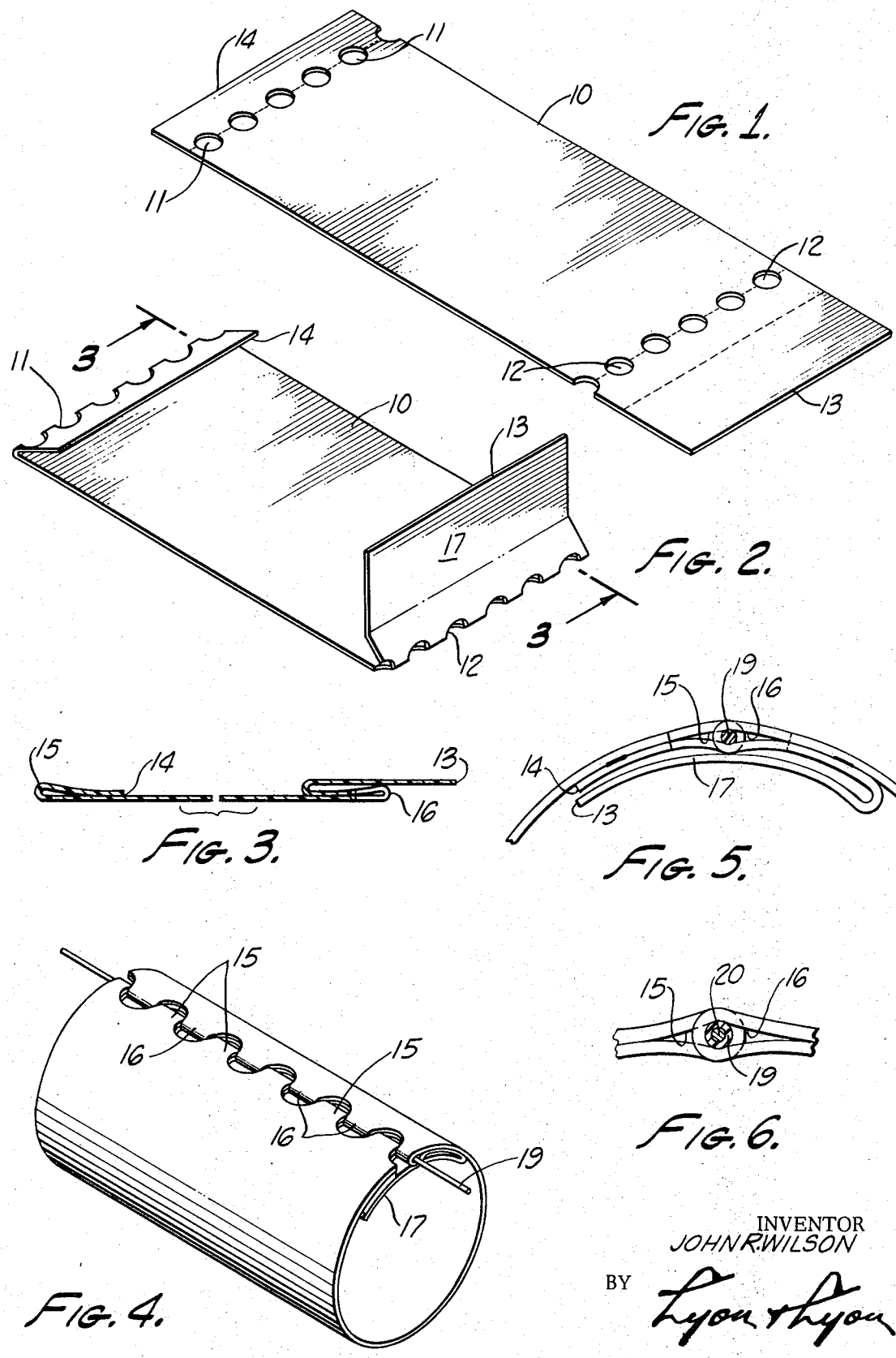

CLOSURE SLEEVE

BACKGROUND OF THE INVENTION

There are many instances where it is desirable to provide a sealing, insulating or protective closure member for elongated objects such as cables, pipes or the like where the ends of the elongated objects are not accessible, or if accessible, where it is undesirable to disconnect or otherwise displace them from their original position. One such closure member is disclosed in U.S. Pat. No. 3,379,218, assigned to the assignee of the present application. Another such closure member is disclosed in U.S. Pat. application Ser. No. 506,161, filed on November 3, 1965 now U.S. Pat. No. 3,455,336 by Roger H. Ellis and assigned to the assignee of the present invention. Still another such closure member is disclosed in U.S. Pat. application Ser. No. 731,200 filed May 22, 1968 by Richard W. Muchmore and assigned to the assignee of the present application. The disclosures of this patent and these applications are incorporated herein by reference. While each of the closure members disclosed in the aforementioned patent and applications are satisfactory in use, they each present some fabrication requirements that are not in all situations desirable for economic reasons.

SUMMARY OF THE INVENTION

According to the present invention a heat recoverable closure member is provided which can be simply and easily fabricated from extruded material, either in sheet form or in tubular form. The extrusion in tubular form is particularly desirable because of the ease in then imparting the material with the property of elastic memory. After the tubular material is expanded, it is longitudinally split to form a more or less flat sheet. A row of holes is made adjacent each edge of the flat sheet and the material is then folded back along the center line of the holes to make a plurality of loops. When the closure is to be installed, it is wrapped around the pipe or the like to be protected and the edges brought together so that the loops along one edge of the sleeve project into the recesses along the other edge. A rod of suitable material is then passed through the loops. The sleeve can now be heat recovered around the object, the rod preventing the edges of the sleeve from separating. The closure sleeve of the present invention is particularly useful in the protection of pipe junctions, especially where the pipes are of large diameter.

It is therefore an object of the present invention to provide a heat recoverable closure member.

It is another object of the present invention to provide such a member which is easy to fabricate and install.

DESCRIPTION OF THE DRAWINGS

FIG. 1 is a perspective view of the closure member of the present invention in its initial form;

FIG. 2 is a perspective view of the closure member of the present invention after the desired folds have been made;

FIG. 3 is a cross-sectional view taken along lines 3-3 of FIG. 2 after folding has been completed;

FIG. 4 is a perspective view of the closure member of the present invention ready for heat recovery;

FIG. 5 is an enlarged end view of the closure of FIG. 4; and

FIG. 6 is an enlarged detail view showing a modification of the closure sleeve shown in FIG. 5.

DESCRIPTION OF THE INVENTION

As mentioned above, the closure sleeve of the present invention utilizes an independently dimensionally heat unstable member. In general, such a member is made of a material capable of having the property of elastic or plastic memory imparted thereto which is heated to above its recovery temperature and expanded under pressure to a configuration greater than its normal configuration and then cooled while kept under pressure. A part treated in this manner will retain its expanded position until it is again heated to its recovery temperature at which time it will recover to its original shape. Examples of such heat recoverable material is found in Currie U.S. Pat. No. 2,027,962 and Cook et al. U.S. Pat. No. 3,086,242, the disclosures of which are incorporated herein by reference. Polymeric materials which have been cross-linked by chemical means or by irradiation, for example, with high energy electrons or nuclear radiation, are preferred for use in the present invention. Noncrystalline polymeric materials exhibiting the property of plastic or elastic memory, such as polyurethane, ionomers, etc., could also be used in practicing the present invention. Since the closure members of the present invention can be made from material having either plastic or elastic memory, the terms "elastic memory" and "plastic memory" are used interchangeably and are intended to be mutually inclusive.

According to the present invention a flattened sheet of material having the property of elastic memory, that is, of being heat recovered, is used, the piece of material either being extruded or molded in the flattened form, or, preferably, being extruded in tubular form and then expanded, for example, in the manner taught in the aforementioned Cook et al. patent, and then slit longitudinally. Such a flattened piece of material is shown at 10 in the drawing. The piece of material 10 is provided with a row of holes 11 adjacent one edge and holes 12 adjacent the other edge, the holes 11 and 12 preferably being staggered. In the case of a tubular member, the holes can be made in the material after it has been split or may be made in the material prior to splitting. As can be seen in FIG. 1, the holes 12 are preferably spaced a greater distance from the edge 13 than are the holes 11 from the edge 14.

The next step in the fabrication of the closure sleeve is to fold the material along the center line of the two rows of holes. This is shown in FIG. 2. Folding in this manner leaves loops 15 along one edge of the material and loops 16 along the other edge, the loops being staggered as were the holes in the two rows. As shown in the figures, the excess portion of the material adjacent the edge 13 is folded over to form a flap 17 which will provide an overlapping joint when the closure member is wrapped in tubular form. If desired, an adhesive and sealant can be used to hold the material in the position shown in the various figures. Such adhesive is shown at 18 in FIG. 5.

The closure sleeve in tubular form is shown in FIG. 4. As can be seen, the loops 15 project into the recesses between the loops 16 and vice versa. A rod 19 of any suitable material such as Teflon is alternately inserted in loops 15 and 16, the rod 19 thus holding the two edges of the material together and retaining the member in tubular form. As can be seen, the flap 17 crosses below the loops 15 and 16 and thus forms a seal for the member after it is heat recovered. If desired, the whole inner surface of the part can be provided with a suitable mastic or hot melt adhesive to insure that a seal will be made.

As shown in FIG. 6, the rod 19 may be provided with a metallic core 20. This metallic core provides strength for the rod and can also be used for additional functions such as an electrical conductor. Such might be particularly desirable where the closure sleeve is used on an electrical cable and it is desired to continue the shielding. This could be done by connecting the shielding on either end of the closure to the conductor 20.

The closure member of the present invention is particularly useful in protecting joints or junctions of large diameter pipes such as water supply pipes. These pipes may have diameters as large as 6 feet or more which requires that the length of the piece of material 10 be on the order of 20 feet. To form such a closure member, it has been found desirable to expand a piece of tubing of suitable length longitudinally rather than diametrically and then slit it along its length. The loops 11 are then formed at the ends of the expanded tubing.

Because of the length of such a closure member, the more conventional methods of heat recovering it are not always wholly satisfactory. In place of such conventional methods as hot air blowers or a torch, the closure member may be recovered by combining it with pyrotechnic materials in the manner taught by Wetmore application Ser. No. 586,954 filed Oct. 17, 1966 and assigned to the assignee of the present application and Deal et al. application Ser. No. 727,074, filed May 6, 1968 and also assigned to the assignee of the present application. The disclosures of both of these applications are incorporated by reference herein. As disclosed in these applications, suitable pyrotechnic material for use in combination with the closure sleeve of the present invention are aluminum trichloride and water or a fabric impregnated with potassium nitrate. As disclosed in the aforementioned applications, these pyrotechnic materials may be combined with other materials such as greases or may be structurally combined with heat shields or the like.

From the foregoing description, it can be seen that a closure sleeve has been provided which is simple and economical to fabricate and quick and easy to install. The closure sleeve has a very low profile and is particularly adapted for following irregular contours. In the event that the closure sleeve must be removed, this can be accomplished by removing the rod 19 thus permitting the edges of the sleeve to be separated and the sleeve removed.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A heat recoverable closure member comprising an elongated independently dimensionally heat unstable member having a pair of edges which can be brought into adjacency to form a tubular member, the material along each of said edges being folded back to form a plurality of loops therealong, each of said edges being provided with recesses alternating with said loops, the loops of each of said edges being positionable within the recess of the opposite edge, and elongated means for passing through said loops to retain said member in tubular shape.

2. The member of claim 1 wherein said material adjacent one of said edges is provided with an additional fold to form a sealing flap.

3. The member of claim 2 wherein the surface of said material forming the inner surface of said tubular member is coated with a sealing material.

4. A heat recoverable closure member comprising a piece of independently dimensionally heat unstable material having a pair of edges, a plurality of holes formed in said material along each edge thereof, each edge of said pair of edges being folded along a line intersecting said holes to form a plurality of loops adaptable to receive rod means.

5. The closure member of claim 4 wherein said rows of holes are staggered.

6. The closure member of claim 5 wherein the folded material adjacent one edge is folded back upon itself to form a flap extending beyond said loops.

7. The closure member of claim 4 wherein said folded material forming said loops is bonded to the unfolded portion of said material.